Dec. 27, 1960 T. HAFNER 2,966,644

FLEXIBLE SURFACE WAVE TRANSMISSION LINES

Filed Oct. 20, 1958

INVENTOR.
THEODORE HAFNER

United States Patent Office 2,966,644

Patented Dec. 27, 1960

2,966,644

FLEXIBLE SURFACE WAVE TRANSMISSION LINES

Theodore Hafner, 1501 Broadway, New York, N.Y.

Filed Oct. 20, 1958, Ser. No. 768,197

11 Claims. (Cl. 333—95)

This invention relates to flexible surface wave transmission lines and especially to transmission lines permitting low-loss transmission of large high-frequency powers in a movable or transportable radio installation.

One of the objects of the invention is a surface wave transmission line consisting of at least two conducting portions arranged substantially parallel to each other at predetermined distances from each other and interconnected by short circuiting bridges at distances which are small against operating wave lengths.

Another object of the invention is a flexible surface wave transmission line consisting of stranded wires arranged closely spaced parallel to, but not interwoven with each other, spiralling around a longitudinal axis with a lay which is large against operating wave length, all covered by low-loss high dielectric constant coating adapted to concentrate the surface wave within a predetermined cylindrical space.

Still another object of the invention is to provide surface wave transmission lines consisting of several parallelly arranged conductors, whether only spirally interwoven or not (but preferably not interwoven) and also preferably wound with a lay which is long against operating wave length and interconnected with each other at predetermined points thereof distanced by intervals which are small against operating wave length, all covered by low-loss high dielectric constant coating adapted to concentrate the surface wave within a predetermined cylindrical space.

A further object of the invention is to provide a surface wave transmission line consisting of two flat longitudinal portions spaced parallelly from each other and bridged by conducting cross portions at distances which are small against operating wave length, all covered by low-loss high dielectric constant coating adapted to concentrate the surface wave within a predetermined cylindrical space.

A more specific object of the invention is a perforated tape wherein the conducting bridges are arranged at distances which are small against operating wave length and the insulation has approximately an oval shape to reduce wind resistance and avoid flapping.

Still another object of the invention is an insulated two-wire tape wherein the two wires are interconnected by cross wires at distances which are small against operating wave length.

Figure 1:
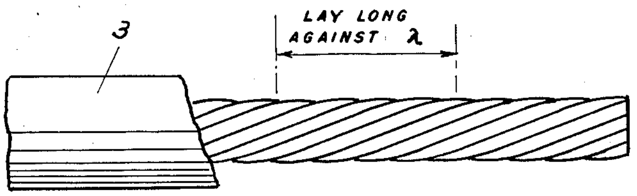
Figure 2:
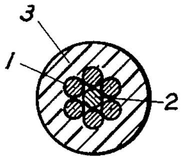

These and other objects of the invention will be more fully apparent from the drawings annexed herewith in which Fig. 1 represents a surface wave transmission line embodying certain features of the invention and Fig. 2, a corresponding cross section thereof.

Figure 3:
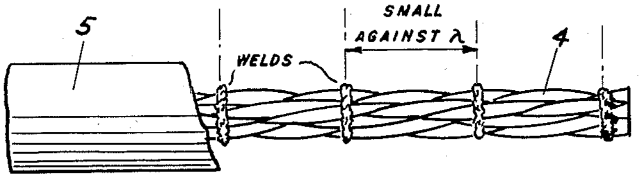
Figure 4:
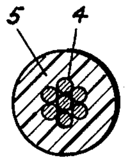

Figs. 3 and 4 in side and front elevations, respectively, represent a modification of the invention.

Figure 5:
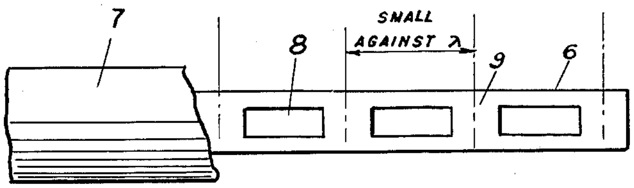
Figure 6:
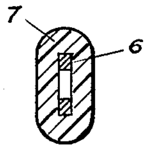

Figs. 5 and 6 also in front and side elevations, respectively, show a surface wave transmission line in tape form according to the invention.

Figure 7:
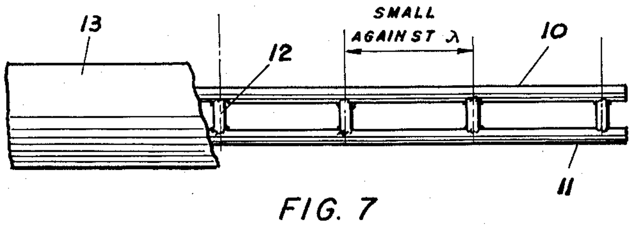
Figure 8:
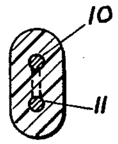

Figs. 7 and 8 represent a two-wire tape adapted to form a flexible surface wave transmission line in accordance with the invention.

In Figs. 1 and 2 a strand consisting of six copper wires 1 is spirally wound around another copper or a steel wire serving to increase strength and schematically indicated at 2 with a lay which is long as compared to the operating wave length of the entire structure for instance six feet for a frequency range between 150–250 megacyles.

The entire wire structure is coated with a polyethylene jacket 3 or any other low-loss dielectric to provide a surface wave field of desired field radius for example 1½ feet for a frequency range of 150–250 mc.

Copper wire 1 may be replaced by Copperweld wire or copper plated steel wire.

The polyethylene coating should be achieved in such a manner as to insure fixation and contact along at least some parts of peripheries or surfaces of wires 1 in a manner sufficient to insure continuity of surface wave propagation with minimum loss.

In Figs. 3 and 4 the wires 4 of the strand are shown to be interwoven, and contact sufficient to insure surface wave propagation is provided by means of soldering, welding or braizing points arranged along and electrically interconnecting the wires at distances small against wave length for example, 4 inches per an operating frequency range of 150–250 megacycles.

At the same time, in order to further assure continuity of surface wave transmission, the lay of wires 4 which may consist of copper, Copperweld, or copper plate, may also be large as compared to the operating wave length in a manner similar to that described with respect to the embodiment of Figs. 1 and 2.

If necessary, and in order further to enhance flexibility, wires 4 themselves may consist of strands of fine wires (not shown).

The entire wire structure is coated with a polyethylene jacket similar to that shown in the embodiment of Figs. 1 and 2, or with any other low-loss dielectric serving to provide the desired concentration of the surface wavefield.

Figs. 3 and 4 show a surface wave transmission 1 in the form of a perforated tape 6 which may be coated with the polyethylene jacket 7 in such a way that tape 6 forms a spiral within the packet preferably of rather large lay as compared to the operating wave length, about several times of such operating wave length.

Alternatively, however, flexibility at least in one direction may be enhanced by positioning tape 6 in a constant plane in the polyethylene jacket.

In order further to increase flexibility, tape 6 is provided with punched holes or perforations schematically indicated at 8 separated by conecting bridges 9 arranged at distances which are small against operating wave length.

Tape 6 may consist of copper, or copper plated or silver plated steel.

The modification of Figs. 7 and 8 provides a flexible surface wave transmission 1 of the general form of a two-wire tape line; with the two wires 10, 11, however, being interconnected by conductive bridges soldered, braized or welded between wires 10 and 11 at distances which are small against operating wave length. The entire wire structure is molded into a field determining polyethylene jacket schematically indicated at 13.

In this case, too, the two wire system 10, 11 may be molded into jacket 13 in a constant planar configuration or spirally at a desired lay if required.

The invention is not limited to the number, shape or form of material nor to the specific connections of the wire and tape illustrated and described, nor to the frequency range concerned but may be applied in any form or manner whatsoever without departing from the scope of this disclosure as claimed herein.

I claim:

1. A flexible surface wave transmission line comprising means for launching and receiving surface waves of a predetermined frequency range, a number of conductors bundled to form a substantially unitary elongated structure coupled at its ends to said launching and receiving means respectively, and conducting bridges provided at predetermined points along said bundled wires to permanently conductively interconnect said wires at distances which are small against said operating wave length and surface modifying means surrounding said conductors for concentrating the surface wave field transmitted outside and along said conductors within a predetermined cylindrical space surrounding said conductors.

2. A flexible surface wave transmission line according to claim 1 wherein said conductors are spirally wound forming the outer surface of a cylinder with a lay which is large against operating wave length.

3. A flexible surface wave transmission line according to claim 1 wherein said interconnections are welding points.

4. A flexible surface wave transmission line according to claim 3 comprising a center core consisting of copper-coated steel wire welded at said predetermined points to the other wires to provide conducting bridges at distances which are small against operating wave length.

5. A flexible surface wave transmission line according to claim 1 wherein said conductors are parallel and interwoven.

6. A flexible surface wave transmission line according to claim 1 wherein said conductors are parallel but not interwoven.

7. A flexible surface wave transmission line according to claim 1 comprising a center core consisting of steel wire.

8. A flexible surface wave transmission line comprising means for launching and receiving surface waves of a predetermined frequency range, and at least two parallel conducting portions forming a substantially unitary elongated structure coupled at its ends to said launching and receiving means respectively, and arranged at a predetermined distance from each other and having conducting bridges at distances which are small against operating wave length and surface modifying means surrounding said conductors for concentrating the surface wave field transmitted outside and along said conductors within a predetermined cylindrical space surrounding said conductors.

9. A flexible surface wave transmission line according to claim 8 wherein said parallel conducting portions consist of wire.

10. A flexible surface wave transmission line according to claim 8 wherein said parallel conducting portions consist of flat tape, said flat tape and said bridges forming a single tape.

11. A flexible surface wave transmission line according to claim 10 comprising openings separated by said bridges.

References Cited in the file of this patent

UNITED STATES PATENTS

| | | |
|---|---|---|
| 1,190,135 | Faccioli | July 4, 1916 |
| 2,218,085 | Dorian | Oct. 15, 1940 |
| 2,685,068 | Goubau | July 27, 1954 |

FOREIGN PATENTS

| | | |
|---|---|---|
| 10,129 | Great Britain | of 1893 |
| 344,194 | Great Britain | Mar. 5, 1931 |
| 976,702 | France | Mar. 21, 1951 |
| 917,732 | Germany | Sept. 9, 1954 |